(12) United States Patent  (10) Patent No.: US 9,301,299 B2
Garnett et al.  (45) Date of Patent: *Mar. 29, 2016

(54) CHANNEL REPORTING FOR TELEVISION WHITESPACE

(71) Applicant: Microsoft Technology Licensing, LLC, Redmond, WA (US)

(72) Inventors: Paul William Garnett, Albany, NY (US); Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,767

(22) Filed: Dec. 11, 2014

(65) Prior Publication Data

US 2015/0140925 A1  May 21, 2015

Related U.S. Application Data

(63) Continuation of application No. 13/567,093, filed on Aug. 6, 2012, now Pat. No. 8,938,272.

(51) Int. Cl.
*H04B 7/00* (2006.01)
*H04W 72/04* (2009.01)
(Continued)

(52) U.S. Cl.
CPC .......... *H04W 72/0446* (2013.01); *H04W 16/14* (2013.01); *H04W 64/00* (2013.01); *H04W 72/005* (2013.01); *H04W 72/0453* (2013.01)

(58) Field of Classification Search
CPC ................... H04W 72/0446; H04W 72/0453; H04W 72/005; H04W 64/00
USPC .......... 455/509, 3.06, 67.11, 450, 454, 452.2
See application file for complete search history.

(56) References Cited

U.S. PATENT DOCUMENTS 8,233,928 B2  7/2012  Stanforth et al.
8,340,682 B2  12/2012  Taylor et al.
(Continued)

OTHER PUBLICATIONS

Probasco, et al., "Protocol to Access White Space database: PS, use cases and rqmts draft-ietf-paws-problem-stmt-usecases-rqmts-03", Retrieved at <<http://tools.ietf.org/html/draft-ietf-paws-problem-stmt-usecases-rqmts-03>>, Feb. 29, 2012, pp. 1-41.

(Continued)

*Primary Examiner* — Marceau Milord
(74) *Attorney, Agent, or Firm* — Steve Wight; Sandy Swain; Micky Minhas

(57) ABSTRACT

Various technologies described herein pertain to providing spectrum utilization feedback from a whitespace device. A database query for a set of available channels in a spectrum (e.g., broadcast spectrum, etc.) during a time period can be transmitted from the whitespace device to a regulatory authorized database system. The database query includes data that specifies a set of channels used by the whitespace device during a previous time period prior to the time period. Responsive to the database query, a response can be received at the whitespace device from the regulatory authorized database. The response indicates the set of available channels in the spectrum during the time period, where the available channels are unassigned to licensees at a location of the whitespace device during the time period. Moreover, the whitespace device is configured to opportunistically communicate in the spectrum over one or more of the available channels.

20 Claims, 9 Drawing Sheets

(51) Int. Cl.
*H04W 16/14* (2009.01)
*H04W 64/00* (2009.01)
*H04W 72/00* (2009.01)

(56) References Cited

U.S. PATENT DOCUMENTS

| | | | | |
|---|---|---|---|---|
| 8,364,188 | B2* | 1/2013 | Srinivasan et al. | 455/510 |
| 8,437,790 | B1* | 5/2013 | Hassan et al. | 455/509 |
| 8,483,155 | B1* | 7/2013 | Banerjea et al. | 370/329 |
| 8,532,041 | B1 | 9/2013 | Lambert et al. | |
| 8,532,686 | B2* | 9/2013 | Schmidt et al. | 455/513 |
| 8,576,817 | B2 | 11/2013 | Stanforth et al. | |
| 8,577,300 | B2* | 11/2013 | Gossain et al. | 455/66.1 |
| 8,583,157 | B2 | 11/2013 | Stanforth et al. | |
| 8,605,741 | B2* | 12/2013 | Kim et al. | 370/431 |
| 8,660,079 | B2* | 2/2014 | Seok | 370/329 |
| 8,749,714 | B2 | 6/2014 | Sadek et al. | |
| 8,755,813 | B2* | 6/2014 | Yee et al. | 455/454 |
| 8,805,427 | B2* | 8/2014 | Hassan et al. | 455/509 |
| 8,824,435 | B2* | 9/2014 | Seok et al. | 370/338 |
| 8,913,577 | B2* | 12/2014 | Kim et al. | 370/329 |
| 8,929,935 | B2* | 1/2015 | Hassan et al. | 455/509 |
| 8,938,272 | B2* | 1/2015 | Garnett et al. | 455/509 |
| 8,948,801 | B2* | 2/2015 | Schmidt et al. | 455/509 |
| 9,008,710 | B2* | 4/2015 | Chetlur et al. | 455/509 |
| 9,078,196 | B2* | 7/2015 | Kim et al. | |
| 2010/0195590 | A1 | 8/2010 | Park | |
| 2010/0197317 | A1 | 8/2010 | Sadek et al. | |
| 2010/0246506 | A1 | 9/2010 | Krishnaswamy | |
| 2010/0255794 | A1 | 10/2010 | Agnew | |
| 2011/0195667 | A1 | 8/2011 | Hassan et al. | |
| 2011/0287802 | A1 | 11/2011 | Ma et al. | |
| 2011/0310253 | A1 | 12/2011 | Singh et al. | |
| 2014/0038655 | A1 | 2/2014 | Garnett et al. | |

OTHER PUBLICATIONS

Werbach, Kevin, "Castle in the Air: A Domain Name System for Spectrum", Retrieved at <<http://www.law.northwestern.edu/depts/legalpub/lawreview/v104/n2/613/LR104n2Werbach.pdf>>, Northwestern University Law Review, vol. 104, Issue 2, 2010, pp. 613-640.
"White Spaces Geolocation Database", Retrieved at <<http://www.wirevolution.com/2010/09/24/white-spaces-geolocation-database/>>, Sep. 24, 2010, pp. 1-7.

* cited by examiner

CHANNEL REPORTING FOR TELEVISION WHITESPACE

CROSS-REFERENCE TO RELATED APPLICATION

This application is a continuation of U.S. patent application Ser. No. 13/567,093, filed on Aug. 6, 2012, and entitled "CHANNEL REPORTING FOR TELEVISION WHITESPACE", the entirety of which is incorporated herein by reference.

BACKGROUND

Telecommunications regulatory bodies commonly allocate different portions of the radio spectrum for disparate uses, and may license rights to use various channels (e.g., frequency bands) within given portions of the radio spectrum. For instance, a portion of the radio spectrum can be allocated by a telecommunications regulatory body for broadcast service; such portion of the radio spectrum can be referred to as a broadcast spectrum. The telecommunications regulatory body may assign licenses to various licensees to use channels in the broadcast spectrum. Thus, a licensee may be allotted rights to use a particular channel from the broadcast spectrum in a geographic region. Further, the licensee may be assigned rights to use the particular channel from the broadcast spectrum during a given period of time.

However, some channels within the broadcast spectrum may be unused at a particular location during a given time period. These channels can be referred to as whitespaces. For example, the telecommunications regulatory body can assign whitespaces (e.g., as guard bands) between channels to mitigate interference. Moreover, whitespaces can naturally exist between used channels, since assigning nearby transmissions to immediately adjacent channels can cause destructive interference to both channels. Further, there may be unused channels within the broadcast spectrum; for instance, an unused channel may have been previously unassigned by the telecommunications regulatory body or such channel may have become unassigned due to technology changes (e.g., previously assigned but presently unassigned). According to an example, the switchover from analog television to digital television freed various channels in the broadcast spectrum. In the United States, analog television broadcasts typically occurred between 54 MHz and 806 MHz prior to the transition to digital television, while the frequency band from 698 MHz to 806 MHz is generally unused for digital television broadcasts subsequent to the transition to digital television.

Various proposals have advocated using whitespaces in the broadcast spectrum to provide wireless broadband Internet access or for unlicensed use in general. A device configured to use these available channels can be referred to as a whitespace device. In some conventional approaches, the whitespace device can be designed to detect available channels in the broadcast spectrum and utilize at least a subset of the channels detected as being available for communications (e.g., transmit signals from the whitespace device over such channel(s), receive signals at the whitespace device over such channel(s), etc.). Thus, in such conventional approaches, the whitespace device commonly searches for channels which lack transmissions from assigned licensees (e.g., television broadcasters, wireless microphones, etc.); yet, such an approach can be costly, inefficient, and difficult to implement.

More recently, a database approach for detecting whitespaces has been proposed. For instance, a regulatory authorized database can be populated with information pertaining to assigned licensees within the broadcast spectrum (e.g., television broadcasters, wireless microphones, etc.). A whitespace device can query the regulatory authorized database for available channels at a location of the whitespace device during a time period. In response, the whitespace device can receive a list of the available channels at the location for the time period, where the time period can depend upon jurisdiction (e.g., two hours, twenty four hours, etc.).

SUMMARY

Described herein are various technologies that pertain to providing spectrum utilization feedback from a whitespace device. A database query for a set of available channels in a spectrum during a time period can be transmitted from the whitespace device to a regulatory authorized database system. The database query includes data that specifies a set of channels used by the whitespace device during a previous time period prior to the time period. Responsive to the database query, a response can be received at the whitespace device from the regulatory authorized database. The response indicates the set of available channels in the spectrum during the time period, where the available channels are unassigned to licensees at a location of the whitespace device during the time period. Moreover, the whitespace device is configured to opportunistically communicate in the spectrum over one or more of the available channels. The spectrum can be a broadcast spectrum, for example. In accordance with other examples, the spectrum can be a licensed spectrum, an unlicensed spectrum, or the like.

In accordance with various embodiments, the regulatory authorized database system can receive the database query from the whitespace device, where the database query includes the data that specifies the set of channels used by the whitespace device during the previous time period. The regulatory authorized database system can identify the set of available channels in the spectrum for the whitespace device during the time period at the location of the whitespace device from a regulatory authorized database retained in a data repository. Moreover, the regulatory authorized database system can transmit a response to the whitespace device that indicates the set of available channels in the spectrum for the whitespace device during the time period at the location of the whitespace device. Further, the regulatory authorized database system can populate a spectrum utilization database with the data that specifies the set of channels used by the whitespace device during the previous time period.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
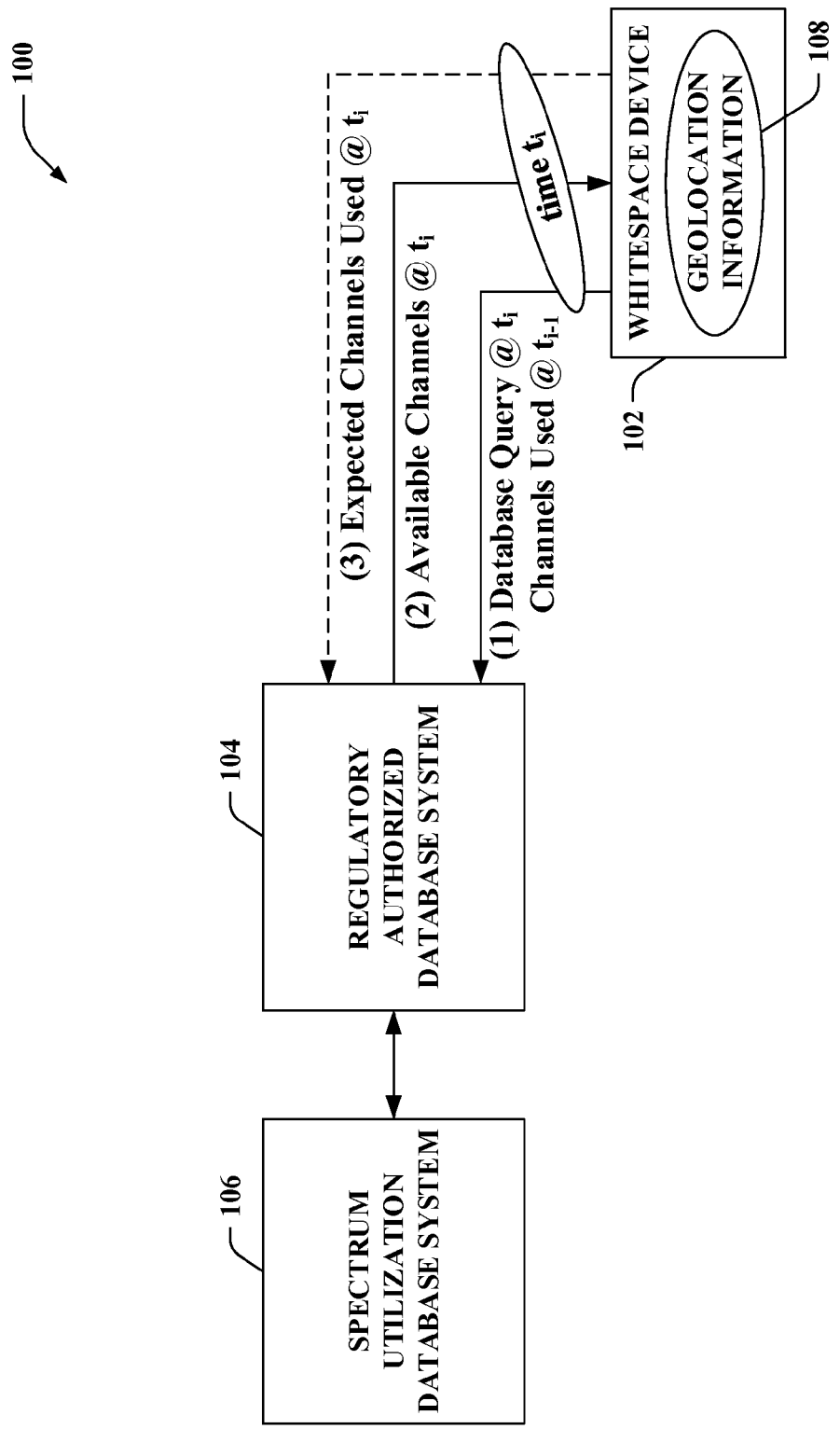
FIG. 1 illustrates a functional block diagram of an exemplary system that provides spectrum utilization feedback from a whitespace device.

Various technologies pertaining to reporting channel usage within the broadcast spectrum are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, spectrum utilization feedback can be provided from a whitespace device. More particularly, the feedback reported by the whitespace device can include data that specifies a set of channels used by the whitespace device during a prior time period. Other information related to the prior time period can also be reported such as, for instance, power level(s) used on the channels, application(s) for which the channels were used, session lengths, or the like. Such feedback can be included in a database query sent to regulatory authorized database system, where a response to the query can indicate a set of available channels in a broadcast spectrum for the whitespace device during a time period at a particular location. Moreover, the database query can include a unique device identifier. Further, a spectrum utilization database can be populated with the spectrum utilization feedback from the whitespace device (and disparate whitespace devices).

Referring now to the drawings, FIG. 1 illustrates a system 100 that provides spectrum utilization feedback from a whitespace device 102. The whitespace device 102 can be substantially any type of device that can transmit and/or receive information over a channel in the broadcast spectrum. Examples of the whitespace device 102 include, but are not limited to, access points, routers, personal computers, mobile devices, consumer electronic devices, game consoles, and the like.

The broadcast spectrum is allocated by a telecommunications regulatory body. Examples of the telecommunications regulatory body include, but are not limited to, the Federal Communications Commission (FCC) in the United States, Ofcom in the United Kingdom, and the like. Moreover, in a given jurisdiction, the telecommunications regulatory body can authorize a regulatory authorized database system 104, which can include a regulatory authorized database (or a plurality of such regulatory authorized database systems).

According to an example, the broadcast spectrum can be a television broadcast spectrum. By way of another example, the broadcast spectrum can include a television broadcast spectrum. Further, the television broadcast spectrum can refer to a portion of the radio spectrum allocated by a telecommunications regulatory body for television broadcast service.

While many of the examples set forth herein pertain to the broadcast spectrum, it is to be appreciated that these examples can be applicable outside of the broadcast spectrum. For instance, the examples described herein can be extended to a licensed spectrum, an unlicensed spectrum (e.g., Unlicensed National Information Infrastructure (U-NII) band, etc.), and so forth. The licensed spectrum, the unlicensed spectrum, etc. are allocated by the telecommunications regulatory body.

The whitespace device 102 can query the regulatory authorized database included in the regulatory authorized database system 104 for available channels in a spectrum (e.g., broadcast spectrum, licensed spectrum, unlicensed spectrum, combination thereof, etc.) at a location of the whitespace device 102 during a time period $t_i$. For instance, the available channels can be television whitespaces. Moreover, the whitespace device 102 can provide channel feedback pertaining to use of channels. More particularly, the whitespace device 102 can report a set of channels used by the whitespace device 102 during a previous time period $t_{i-1}$ when sending a query to the regulatory authorized database system 104. The spectrum utilization feedback can be retained in a spectrum utilization database included in a spectrum utilization database system 106.

The time period $t_i$ can be any time period (i can be substantially any integer). Moreover, the previous time period $t_{i-1}$ can be a most recent time period before the time period $t_i$.

In accordance with an illustration, a server or a set of servers can include the regulatory authorized database system 104. Further, a server or a set of servers can include the spectrum utilization database system 106. The server or set of servers that include the regulatory authorized database system 104 can be the same and/or differ from the server or set of servers that include the spectrum utilization database system 106. Yet, it is to be appreciated that the claimed subject matter is not limited to the foregoing illustration.

The whitespace device 102 can transmit a database query for a set of available channels in a broadcast spectrum during a time period $t_i$. The database query, which is transmitted from the whitespace device 102 to the regulatory authorized database system 104, includes data that specifies a set of channels used by the whitespace device 102 during a previous time period $t_{i-1}$ prior to the time period $t_i$. Moreover, the whitespace device 102 is associated with geolocation information 108, which specifies the location of the whitespace device. According to an example, the database query sent by the whitespace device 102 can include the geolocation information 108 of the whitespace device 102 that specifies the location of the whitespace device 102. By way of yet another example, the regulatory authorized database system 104 can determine the geolocation information 108 of the whitespace device 102 in substantially any manner.

The regulatory authorized database system 104 can identify the set of available channels in the broadcast spectrum for the whitespace device 102 during the time period $t_i$. The set of available channels can be determined by the regulatory authorized database system 104 based at least in part upon the geolocation information 108 of the whitespace device 102. Moreover, the regulatory authorized database system 104, in response to the database query from the whitespace device 102, can send a response that indicates the set of available channels in the broadcast spectrum identified for the whitespace device 102 during the time period $t_i$. Thus, the regulatory authorized database system 104 responds to the whitespace device 102 with a set of whitespaces, namely, the set of available channels that can be used by the whitespace device 102 for the location of the whitespace device 102 (e.g., based on the geolocation information 108).

The available channels in the set are unassigned to licensees at the location of the whitespace device 102 during the time period $t_i$. Further, the whitespace device 102 is configured to opportunistically communicate in the broadcast spectrum over one or more of the available channels in the set of available channels indicated by the regulatory authorized database system 104. The whitespace device 102 can select one or more of the available channels for use during the time period $t_i$. Moreover, the whitespace device 102 can periodically query the regulatory authorized database system 104 for the set of available channels. The periodicity of such queries can be jurisdiction dependent (e.g., two hours between queries, twenty four hours between queries, etc.).

Optionally, the whitespace device 102 can send information indicating channels (e.g., from the set of available channels) expected to be used by the whitespace device 102 during the time period $t_i$ back to the regulatory authorized database system 104 in reply to the response from the regulatory authorized database system 104. However, it is to be appreciated that the claimed subject matter is not limited to such transmission of information pertaining to the expected channels to be used during the time period $t_i$ by the whitespace device 102.

The regulatory authorized database system 104 can provide the information related to channels used during the previous time period $t_{i-1}$ to the spectrum utilization database system 106. Accordingly, the spectrum utilization database system 106 can collect information related to spectrum use. Such information can include channels used, power levels, device types, time of day, etc. of use by the whitespace device 102 and disparate whitespace devices (not shown). It is contemplated that the information retained in the spectrum utilization database of the spectrum utilization database system 106 can be used by regulators, service providers, whitespace devices, and so forth.

When the database approach was proposed, some regulators and broadcasters were interested in knowing how whitespaces were used as well as types of devices using such whitespaces. A conventional technique for tracking such spectrum utilization commonly involved whitespace devices supplying information pertaining to channels expected to be used during a given time period. However, oftentimes the channels that are expected to be used differ from channels actually used during a given time period. A mechanism whereby the whitespace device 102 and the disparate whitespace devices inform the regulatory authorized database system 104 and the spectrum utilization database system 106 of anticipated channel use, however, may result in erroneous information being retained in such spectrum utilization database. Thus, such mechanism can potentially cause increased chat over valuable spectrum and can lead to inconsistent reporting of spectrum use. Further, decisions made by service providers, regulators, whitespace device, and the like based on such information can be detrimentally impacted due to inaccuracies in such information. Moreover, conventional approaches may lack a mechanism to assign the spectrum information being reported by the whitespace device 102 and the disparate whitespace devices.

According to an illustration, with a conventional approach where a whitespace device reports expected channel use without reporting actual channel use for a previous time period, a device vendor may configure the whitespace device to typically report that such device anticipates using more available channels than the whitespace device will actually use regardless whether this is in fact truthful in operation. Accordingly, this inaccurate information can be collected, and other whitespace devices may use such inaccurate information (e.g., improperly determine that more interference is likely to exist on the available channels than actually exists on such channels). Thus, a database in which such information is collected may be rendered ineffective in such a conventional approach.

Figure 2:
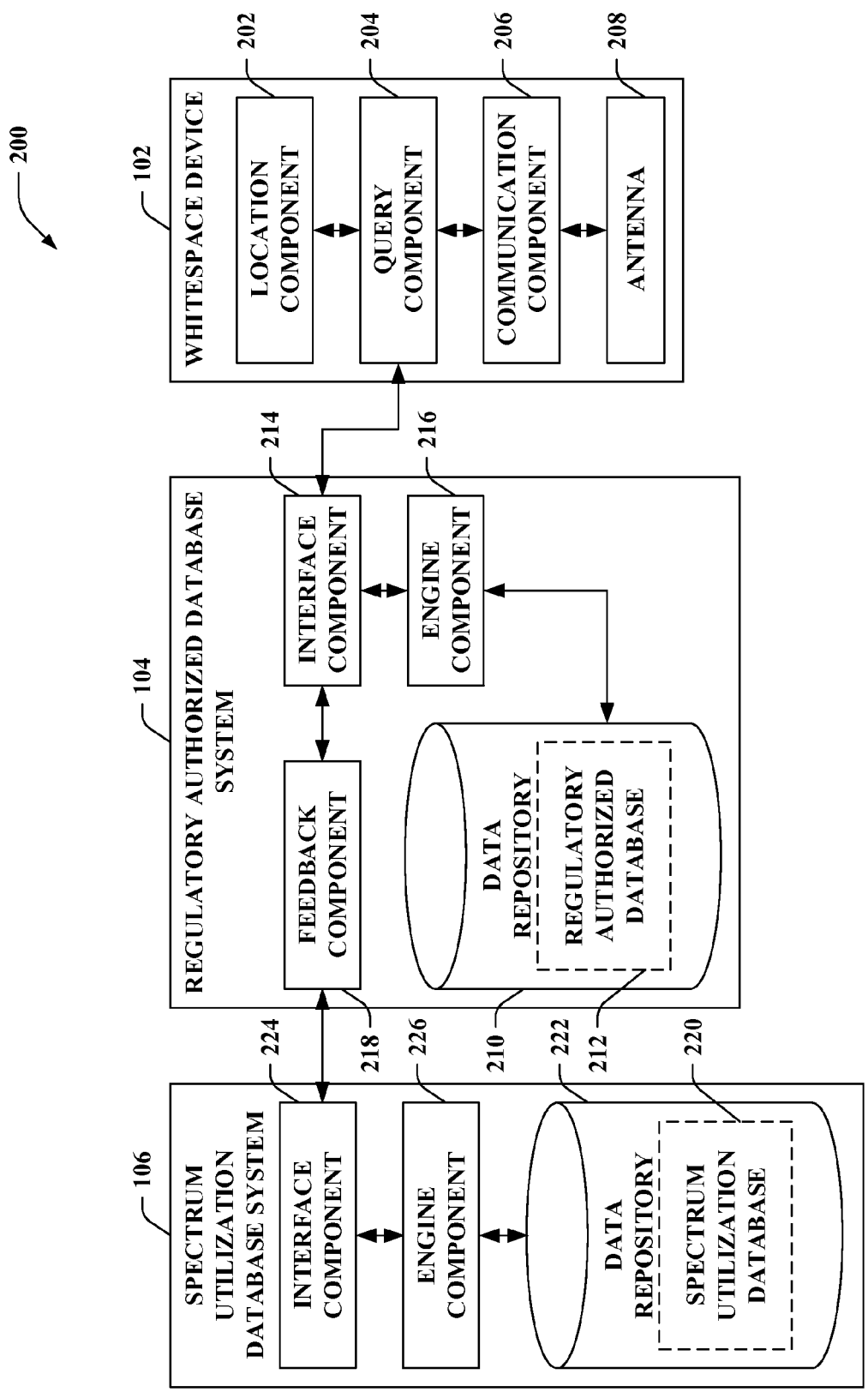
FIG. 2 illustrates a functional block diagram of an exemplary system that collects spectrum utilization feedback from the whitespace device.

Turning to FIG. 2, illustrated is a system 200 that collects spectrum utilization feedback from the whitespace device 102. The system 200 includes the whitespace device 102, the regulatory authorized database system 104, and the spectrum utilization database system 106.

The whitespace device 102 further includes a location component 202 that can determine a location of the whitespace device 102 (e.g., geolocation information). The location component 202 can measure the location of the whitespace device 102 or receive information pertaining to the location of the whitespace device 102 from another source. For instance, the location component 202 can be a Global Positioning System (GPS) receiver; yet, it is to be appreciated that substantially any type of device capable of determining the location of the whitespace device 102 is intended to fall within the scope of the hereto appended claims. The accuracy of the geolocation information can depend upon the jurisdiction. For instance, in the United States, the accuracy can be measured to be within ±50 m, whereas in the United Kingdom the accuracy can be within ±100 m.

Moreover, the whitespace device 102 includes a query component 204 that can transmit a database query to the regulatory authorized database system 104. For instance, the database query sent by the query component 204 can include the geolocation information determined by the location component 202. However, it is also contemplated that the regulatory authorized database system 104 can alternatively obtain the geolocation information of the whitespace device 102 in substantially any other manner (e.g. the regulatory authorized database system 104 can determine the geolocation information, a different source can provide the geolocation information to the regulatory authorized database system 104, etc.). Further, the query component 204 can also receive, responsive to the database query, a response from the regulatory authorized database system 104.

The query component 204 can send the database query to the regulatory authorized database system 104 and receive the response from the regulatory authorized database system 104 via a wired and/or wireless connection. By way of illustration, if the whitespace device 102 is a laptop computer that can act as a router, then the laptop may transmit the database query and receive the response over a cellular network; yet, the claimed subject matter is not so limited.

The whitespace device 102 further includes a communication component 206 and an antenna 208. The communication component 206 can select channels for transmission and/or reception, schedule channel usage (e.g., transmission from the whitespace device 102, transmission by a disparate device to the whitespace device 102, etc.), control power level(s), modulate signals for transmission from the antenna 208 over the channels, condition signals received by the antenna 208 over the channels, and so forth. Accordingly, the communication component 206 can select and use channel(s) from the set of available channel specified by the regulatory authorized database system 104 during each time period. Further, the query component 204 can include data that specifies the set of channels used by the communication component 206 during the previous time period $t_{i-1}$ in the database query for the time period $t_i$.

The regulatory authorized database system 104 includes a data repository 210 that retains a regulatory authorized database 212. The regulatory authorized database 212 includes information related to utilization of the broadcast spectrum by assigned licensees. At least a portion of the information related to utilization of the broadcast spectrum by the assigned licensees included in the regulatory authorized database 212 is obtained from the telecommunications regulatory body. Some of the information related to utilization of the broadcast spectrum by the assigned licensees included in the regulatory authorized database 212, for instance, can be obtained from other regulatory authorized database system(s) (not shown). Moreover, the information included in the regulatory authorized database 212 (or a portion thereof) can be provided to disparate regulatory authorized database system (s). Thus, regulatory authorized database systems can be synchronized to have common information in respective regulatory authorized databases included therein.

The regulatory authorized database system 104 can further include an interface component 214 that receives, from the whitespace device 102, the database query for the set of available channels in the broadcast spectrum during the time period $t_i$ at the location of the whitespace device 102 sent by the query component 204. Moreover, as noted herein, the database query includes data that specifies the set of channels used by the whitespace device 102 during the previous time period $t_{i-1}$ prior to the time period $t_i$.

The regulatory authorized database system 104 further includes an engine component 216 that identifies, from the regulatory authorized database 212 responsive to the database query, the set of available channels in the broadcast spectrum for the whitespace device 102 during the time period $t_i$ at the location of the whitespace device 102. The available channels in the set are identified by the engine component 216 from the information related to utilization of the broadcast spectrum by the assigned licensees as unassigned to licensees at the location of the whitespace device 102 during the time period $t_i$. Moreover, the interface component 214 can transmit a response to the whitespace device 102 (e.g., the query component 204) that indicates the set of available channels in the broadcast spectrum for the whitespace device 102 during the time period $t_i$ at the location of the whitespace device 102.

Further, the regulatory authorized database system 104 includes a feedback component 218 that populates a spectrum utilization database 220 retained in a data repository 222 of the spectrum utilization database system 106. The feedback component 218 can populate the spectrum utilization database 220 with the data that specifies the set of channels used by the whitespace device 102 during the previous time period $t_{i-1}$. Yet, it is contemplated that the feedback component 218 can also provide other data to the spectrum utilization database 220.

The spectrum utilization database system 106 can further include an interface component 224 and an engine component 226. The interface component 224 can receive the data supplied by the feedback component 218. Moreover, the engine component 226 can incorporate such data in the spectrum utilization database 220 retained in the data repository 222. Accordingly, the spectrum utilization database 220 can include data pertaining to channel usage in the broadcast spectrum. The spectrum utilization database system 106 can also be augmented with additional features; for instance, the spectrum utilization database system 106 (e.g., the engine component 226) can apply signal processing, etc.

As shown in FIG. 2, the regulatory authorized database 212 and the spectrum utilization database 220 can be included in separate data repositories, namely, the data repository 210 included in the regulatory authorized database system 104 and the data repository 222 included in the spectrum utilization database system 106. However, it is to be appreciated that the regulatory authorized database 212 and the spectrum utilization database 220 can be co-located in a common data repository as shown below in connection with FIG. 6 in accordance with another example.

Moreover, it is contemplated that the database query sent by the whitespace device 102 to the regulatory authorized database system 104 can include other information (e.g., in addition to the data that specifies the set of channels used during the previous time period $t_{i-1}$ and the geolocation information (if included)). Examples of such information are set forth below; yet, is contemplated that the claimed subject matter is not limited to the following examples.

For example, the database query sent by the whitespace device 102 to the regulatory authorized database system 104 can include power level data for the whitespace device on the set of channels during the previous time period $t_{i-1}$. The power level data, for instance, can be the power level at which the communication component 206 transmitted and/or received signals over each of the channels in the set during the previous time period $t_{i-1}$. Moreover, the feedback component 218, upon receiving the database query that includes the power level data from the whitespace device 102, can further populate the spectrum utilization database 220 with such power level data for the whitespace device 102.

By way of another example, the database query sent by the whitespace device 102 can further include application data that specifies an application for which the set of channels was used by the whitespace device 102 during the previous time period $t_{i-1}$. Following this example, the regulatory authorized database system 104 can receive the database query that includes the application data. Moreover, the feedback component 218 of the regulatory authorized database system 104 can further populate the spectrum utilization database 220 with the application data that specifies the application for which the set of channels was used by the whitespace device 102 during the previous time period $t_{i-1}$.

According to yet another example, the database query sent by the whitespace device 102 to the regulatory authorized database system 104 can include a unique device identifier that corresponds to the whitespace device 102. By way of illustration, the unique device identifier can include a public key and a private key. The public key and a private key can be used for digital signature of the database query sent by the whitespace device 102. Accordingly, the whitespace device 102 can sign the database query using the private key and the regulatory authorized database system 104 can authenticate the received database query using the public key to identify the source of the database query. Moreover, the feedback component 218 can populate the spectrum utilization database 220 with the unique device identifier included in the database query. For instance, unique device identifiers can be cross correlated when constructing the spectrum utilization database 220.

By way of illustration, the database query sent by the whitespace device 102 can include the unique device identifier that corresponds to the whitespace device, the geolocation information of the whitespace device that specifies the location of the whitespace device determined by the location component 202, the data that specifies the set of channels used by the whitespace device 102 during the previous time period $t_{i-1}$ prior to the time period $t_i$, the power level data for the whitespace device on the set of channels during the previous time period $t_{i-1}$, and the application data that specifies the application for which the set of channels was used by the whitespace device 102 during the previous time period $t_{i-1}$. In accordance with this illustration, a protocol (e.g., XML schema) used for communication between the whitespace device 102 and the regulatory authorized database system 104 can have the following format.

[Device ID: Location+Accuracy: Query Request: Channels used during previous time period: Payload Length: Payload]

It is also contemplated that channels expected to be used can further be included in the foregoing format; yet, the claimed subject matter is not so limited. Moreover, in the foregoing, payload length and payload can be utilized by proprietary extensions to the spectrum utilization database 220, which can be analogous to having multiple regulatory authorized databases. The payload can include the power level data and the application data, for instance. Other information can additionally or alternatively be included in the payload. An example of such other information is session lengths for the set of channels during the previous time period $t_{i-1}$. It is also contemplated that the geolocation information (Location+Accuracy) can include accuracy information pertaining to the accuracy of the location measurement; yet, the claimed subject matter is not so limited.

The spectrum utilization database 220 includes data pertaining to channel usage in the broadcast spectrum. In accordance with various embodiments, the spectrum utilization database 220 can further include data pertaining to channel usage outside of the broadcast spectrum. Thus, the spectrum utilization database 220 can include utilization information across a wider portion of the radio spectrum. For instance, data pertaining to channel usage in the licensed spectrum, unlicensed spectrum (e.g., U-NII band, etc.), or the like can be included in the spectrum utilization database 220.

In accordance with an example, the set of available channels indicated in the response sent by the regulatory authorized database system 104 can be optimized by the regulatory authorized database system 104 based on device class. The engine component 216 can identify the set of available channels as a function of device class of the whitespace device 102. The device class can be associated with a maximum power level of the whitespace device 102. According to an example, three device classes can be set for a given jurisdiction. Following this example, a first device class can be set for fixed devices that can operate up to 4 W EIRP, a second device class can be set for portable devices that can operate up to 100 mW when on a channel that is two or more channels away from a broadcaster or another licensee, and a third device class can be set for portable devices that can operate up to 40 mW when on a channel adjacent to a channel utilized by a broadcaster or another licensee. It is contemplated, however, that different jurisdictions can set different device classes. Moreover, different jurisdictions can have substantially any number of device classes. Yet, such jurisdictions can make a distinction between high-power and low-power devices.

By way of yet a further example, the regulatory authorized database system 104 can retrieve information from the spectrum utilization database 220. Such retrieved information can be used by the regulatory authorized database system 104 (e.g., the engine component 216) to provide different whitespace devices with different subsets of available channels to optimize service for such whitespace devices.

Figure 3:
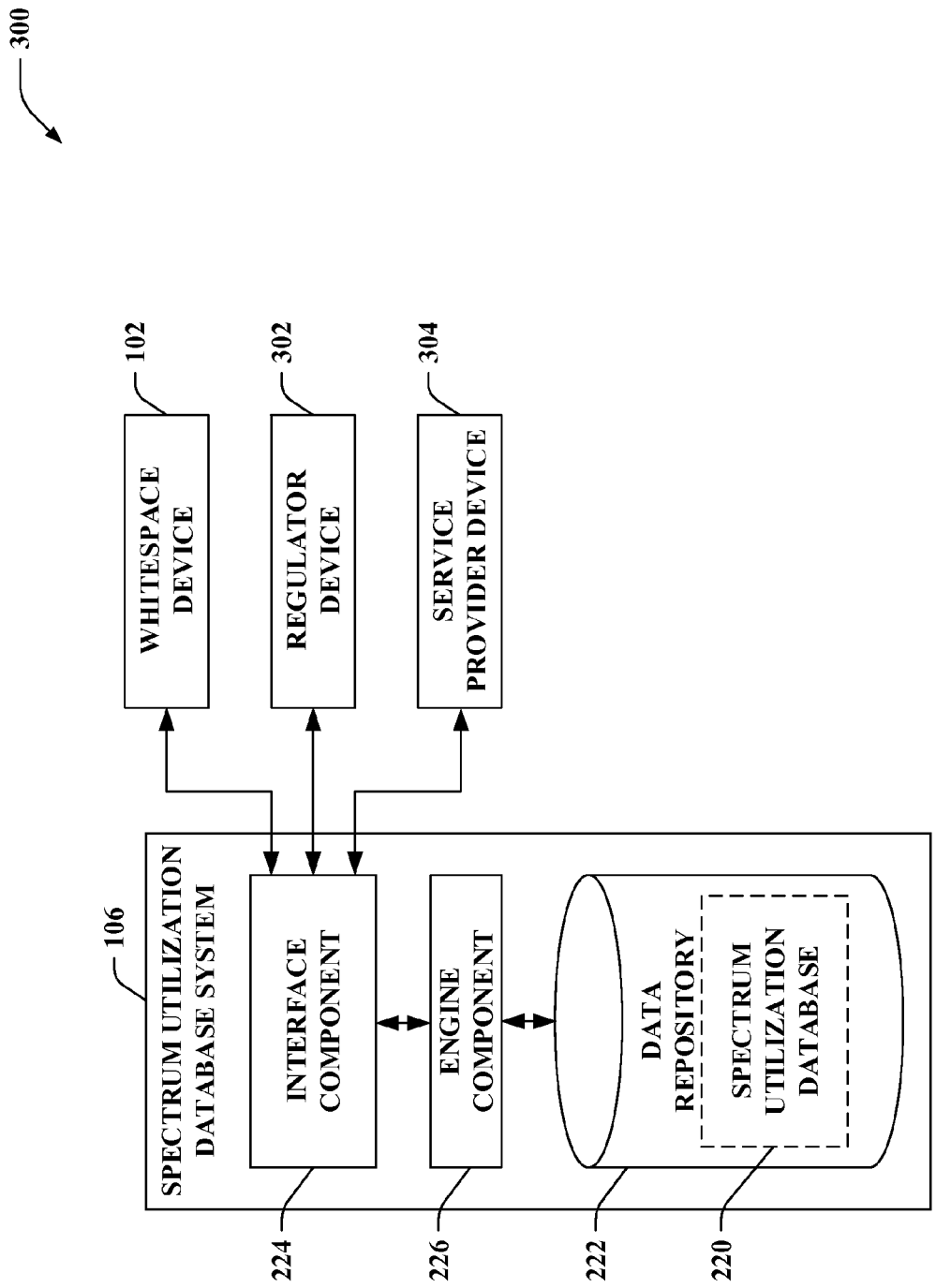
FIG. 3 illustrates a functional block diagram of an exemplary system that retrieves spectrum utilization feedback from the spectrum utilization database.

Referring now to FIG. 3, illustrated is a system 300 that retrieves spectrum utilization feedback from the spectrum utilization database 220. The spectrum utilization database 220 can be accessed by the whitespace device 102, a regulator device 302, a service provider device 304, or the like. As noted above, the spectrum utilization database 220 can include spectrum utilization feedback such as channels used, power levels, device types, time of day, etc. related to channel use. Accordingly, such feedback information can be retrieved by the whitespace device 102, the regulator device 302, the service provider device 304, and so forth.

For instance, the regulator device 302 can retrieve the information included in the spectrum utilization database 220 such that a regulator can use the information when making future policies. According to another example, the service provider device 304 can use such information for network provisioning and designing. Moreover, the whitespace device 102 can employ the information retained in the spectrum utilization database 220 for cognitive use of available channels within the broadcast spectrum and/or outside of the broadcast spectrum (if the spectrum utilization database 220 includes data pertaining to channel usage outside of the broadcast spectrum).

The whitespace device 102, the regulator device 302, the service provider device 304, etc. can access the spectrum utilization database 220 retained in the data repository 222 of the spectrum utilization database system 106 via the interface component 224. For instance, the whitespace device 102, the regulator device 302, and the service provider device 304 can send queries to the interface component 224 and, in response to the queries, the engine component 226 can retrieve information from the spectrum utilization database 220 included in the data repository 222.

According to an example, the whitespace device 102 can transmit a spectrum use query for data pertaining to employment of the set of available channels in the broadcast spectrum indicated by the regulatory authorized database system 104 by disparate whitespace devices. The spectrum use query can be transmitted from the whitespace device 102 to the spectrum utilization database system 106 (e.g., the interface component 224); however, it is also to be appreciated that the spectrum use query can be transmitted from the whitespace device 102 to the regulatory authorized database system 104, and thereafter the regulatory authorized database system 104 can provide the spectrum use query to the spectrum utilization database system 106.

The interface component 224 can receive the spectrum use query from the whitespace device 102, and the engine component 226 can retrieve the data pertaining to employment of the set of available channels in the broadcast spectrum by the disparate whitespace devices. Further, the interface component 224 can transmit the data pertaining to the employment of the set of available channels in the broadcast spectrum to the whitespace device 102.

The whitespace device 102, upon receiving the data pertaining to employment of the set of available channels in the broadcast spectrum by the disparate whitespace devices from the spectrum utilization database system 106, can select a subset of the available channels in the set for use by the whitespace device 102 during the time period $t_i$. Such selection can be based on the data pertaining to employment of the set of available channels in the broadcast spectrum by the disparate whitespace devices. For instance, such selection can be made by the communication component 206 of the whitespace device 102 as shown in FIG. 2; yet, the claimed subject matter is not so limited. Further, the whitespace device 102 can communicate over the subset of the available channels selected.

Figure 4:
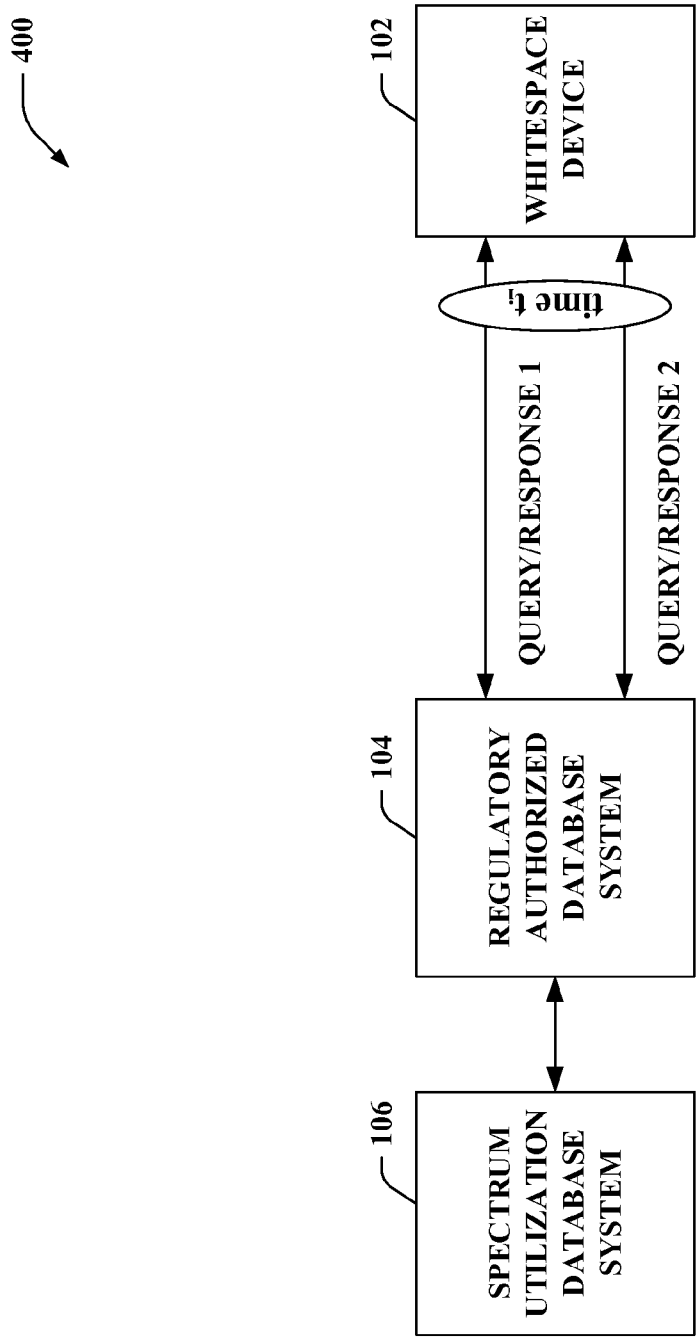
FIG. 4 illustrates a functional block diagram of an exemplary system that queries a regulatory authorized database system for a plurality of device classes.

With reference to FIG. 4, illustrated is a system 400 that queries the regulatory authorized database system 104 for a plurality of device classes. The whitespace device 102 can send a plurality of queries and receive a plurality of responses during the time period $t_i$ for the plurality of device classes. For instance, the whitespace device 102 can transmit a first database query for a first set of available channels in the broadcast spectrum during the time period $t_i$ for a first device class, and can transmit a second database query for a second set of available channels in the broadcast spectrum during the time period $t_i$ for a second device class, where the first device class differs from the second device class. The first device class and the second device class, for instance, are associated with differing maximum power levels.

Each of the database queries (e.g., the first database query and the second database query) can include respective data that specifies respective sets of channels used by the whitespace device 102 during the previous time period $t_{i-1}$ for the respective device classes. Accordingly, the regulatory authorized database system 104 can populate the spectrum utilization database of the spectrum utilization database system 106 with such data.

The regulatory authorized database system 104 further responds to the first database query and the second database query. More particularly, the first response, responsive to the first database query, can indicate the first set of available channels in the broadcast spectrum identified by the regulatory authorized database system 104 for the whitespace device 102 during the time period $t_i$, where the first set is for the first device class. Moreover, the second response, responsive to the second database query, can indicate the second set of available channels in the broadcast spectrum identified by the regulatory authorized database system 104 for the whitespace device 102 during the time period $t_i$, where the second set of available channels is for the second device class.

Although not shown, it is alternatively contemplated that a protocol can be employed whereby a single query can be sent from the whitespace device 102 to the regulatory authorized database system 104 for a plurality of device classes. Following this example, the database query for the set of available channels can be for a plurality of device classes. Moreover, a response sent by the regulatory authorized database system 104 can indicate respective sets of available channels for each of the plurality of device classes. Moreover, each of the plurality of device classes can be associated with differing maximum power levels.

By way of illustration, the whitespace device 102 can be a base station that may communicate with a mobile device (e.g., the base station may transmit signals to the mobile device over a downlink and the mobile device may transmit signals to the base station over an uplink). Accordingly, the base station can query the regulatory authorized database of the regulatory authorized database system 104 as both a low power device (first device class) and a high power device (second device class), and a first response and a second response can be received by the base station from the regulatory authorized database system 104. One or more channels from a first set of available channels indicated in the first response can be selected by the base station for uplink communication, whereas one or more channels from a second set of available channels indicated in the second response can be selected by the base station for downlink communication. However, it is to be appreciated that the claimed subject matter is not limited to the foregoing illustration. Moreover, the above illustration can be extended to a scenario where a single query can be sent from the whitespace device 102 to the regulatory authorized database system 104 for the plurality of device classes.

Figure 5:
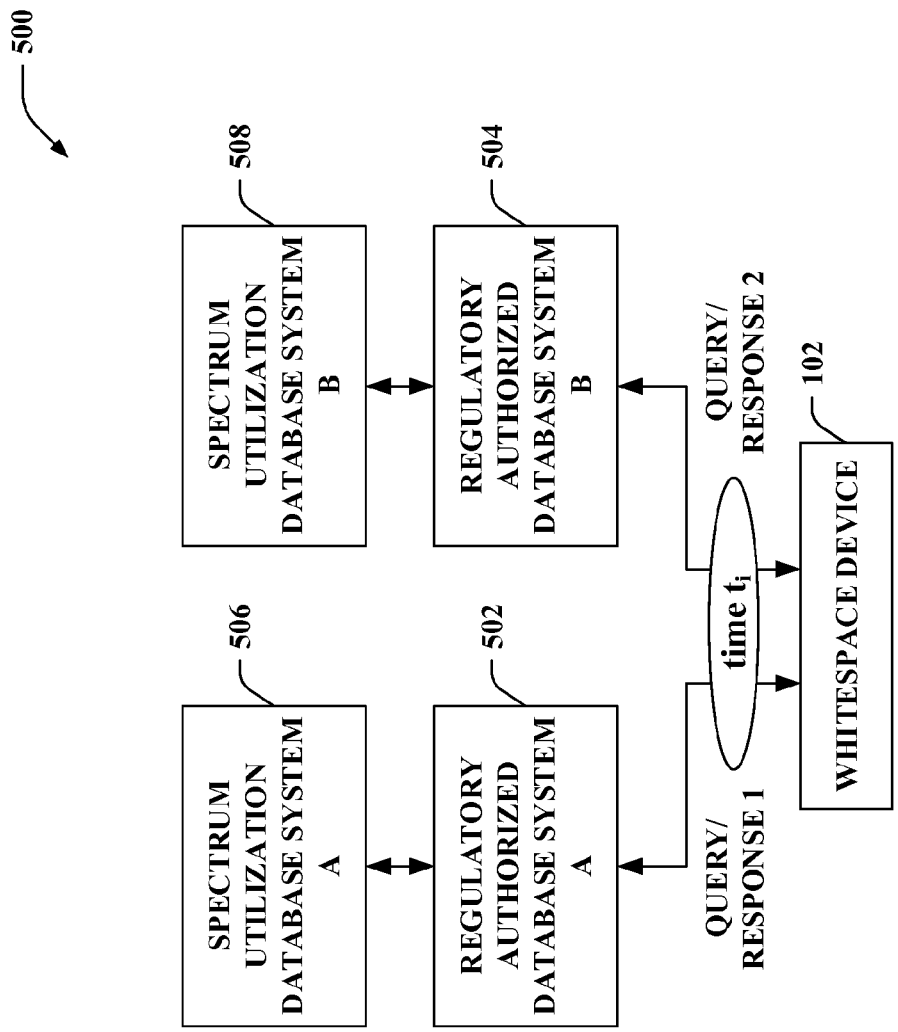
FIG. 5 illustrates a functional block diagram of an exemplary system in which the whitespace device queries a plurality of regulatory authorized databases for a given time period.

Referring now to FIG. 5, illustrated is a system 500 in which the whitespace device 102 queries a plurality of regulatory authorized databases for the time period $t_i$. In the system 500, the whitespace device 102 can send a plurality of database queries to a plurality of regulatory authorized database systems, namely, a regulatory authorized database system A 502 and a regulatory authorized database system B 504 (collectively referred to herein as regulatory authorized database systems 502-504). While two regulatory authorized database systems 502-504 are illustrated in FIG. 5, it is contemplated that the whitespace device 102 can transmit queries to substantially any number of regulatory authorized database systems for the time period $t_i$. Further, the regulatory authorized database systems 502-504 can be substantially similar to the regulatory authorized database system 104.

Each of the regulatory authorized database systems 502-504 can be associated with a corresponding spectrum utilization database system. For instance, the regulatory authorized database system A 502 can be associated with a spectrum utilization database system A 506 and the regulatory authorized database system B 504 can be associated with a spectrum utilization database system B 508 (the spectrum utilization database system A 506 and the spectrum utilization database system B 508 are collectively referred to herein as spectrum utilization database systems 506-508). Moreover, the spectrum utilization database systems 506-508 can be substantially similar to the spectrum utilization database system 106.

The whitespace device 102 can transmit a first database query to the regulatory authorized database system A 502 for a first set of available channels in the broadcast spectrum during the time period $t_i$. Moreover, the whitespace device 102 can transmit a second database query to the regulatory authorized database system B 504 for a second set of available channels in the broadcast spectrum during the time period $t_i$. The regulatory authorized database system A 502 and the regulatory authorized database system B 504 can be administered by differing database administrators authorized by the telecommunications regulatory body. Moreover, the whitespace device 102 can receive, responsive to the first database query, a first response from the regulatory authorized database system A 502, wherein the first response indicates the first set of available channels in the broadcast spectrum identified by the regulatory authorized database system A 502 for the whitespace device 102 during the time period $t_j$. Moreover, the whitespace device 102 can receive, responsive to the second database query, a second response from the regulatory authorized database system B 504, wherein the second response indicates the second set of available channels in the broadcast spectrum identified by the regulatory authorized database system B 504 for the whitespace device 102 during the time period $t_j$.

Figure 6:
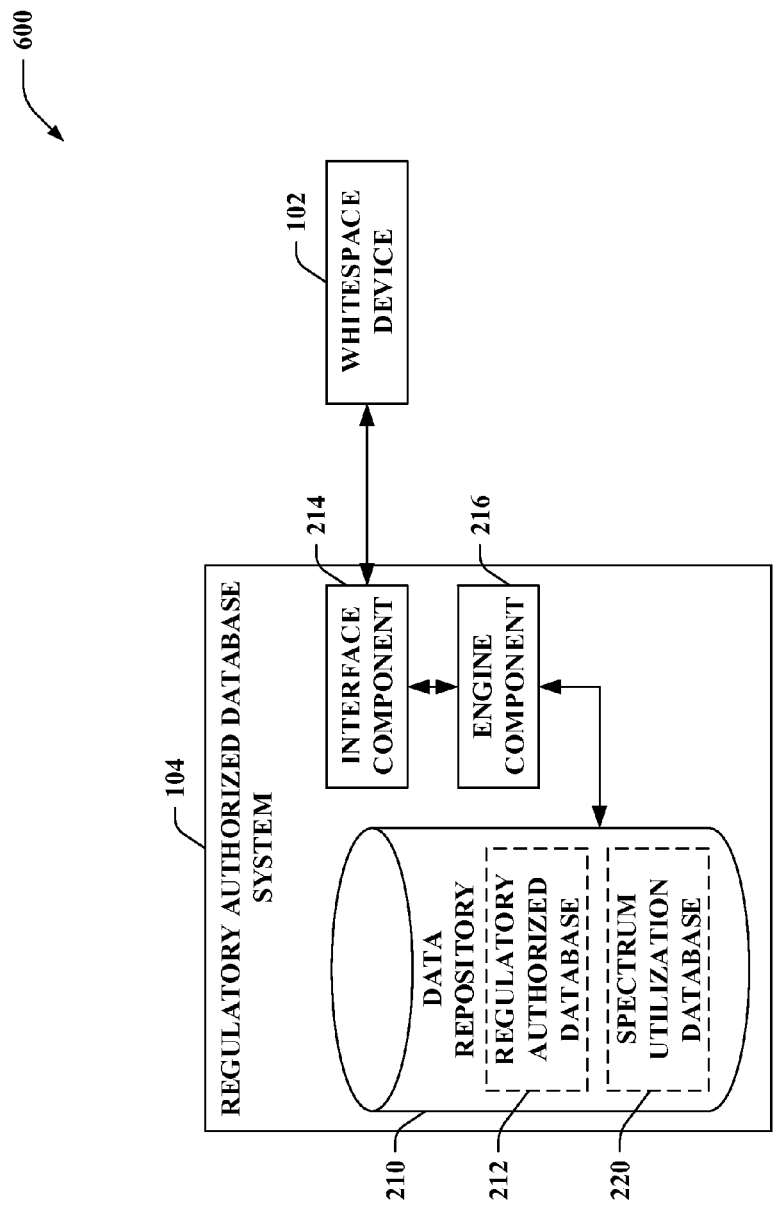
FIG. 6 illustrates a functional block diagram of an exemplary system that includes a regulatory authorized database and a spectrum utilization database being co-located in a common data repository.

With reference to FIG. 6, illustrated is a system 600 that includes the regulatory authorized database 212 and the spectrum utilization database 220 being co-located in a common data repository. The system 600 includes the whitespace device 102 and the regulatory authorized database system 104. Moreover, the regulatory authorized database system 104 includes the data repository 210. The regulatory authorized database 212 and the spectrum utilization database 220 can both be retained in the data repository 210 of the regulatory authorized database system 104. Accordingly, the regulatory authorized database 212 and the spectrum utilization database 220 can be co-located in a common data repository. The engine component 216 can store the data that specifies the set of channels used by the whitespace device 102 during the previous time period (and/or any other data) in the spectrum utilization database 220 retained in the data repository 210. It is to be appreciated, however, that the claimed subject matter is not limited to the example set forth in FIG. 6.

Figure 7:
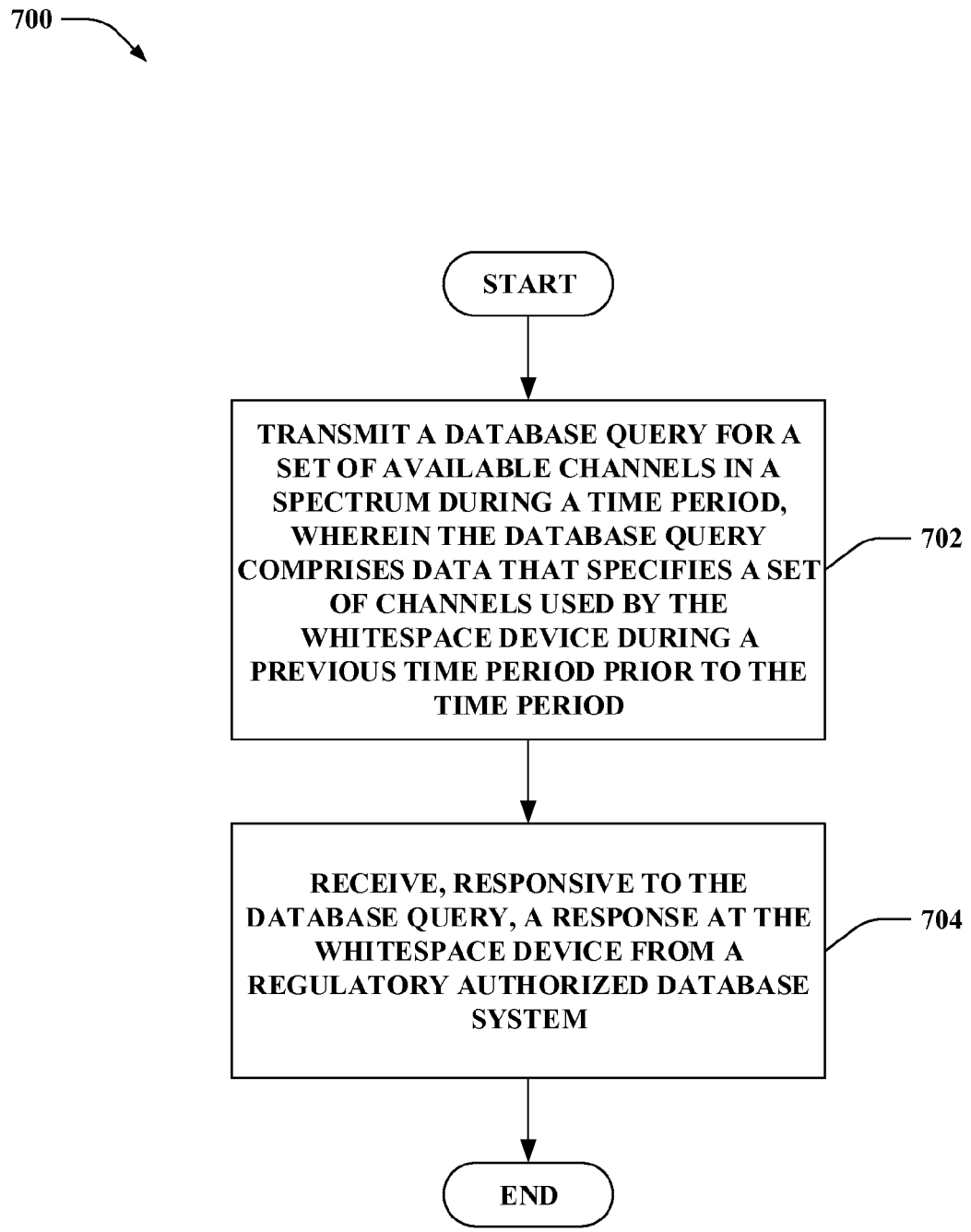
FIG. 7 is a flow diagram that illustrates an exemplary methodology of providing spectrum utilization feedback from a whitespace device.
Figure 8:
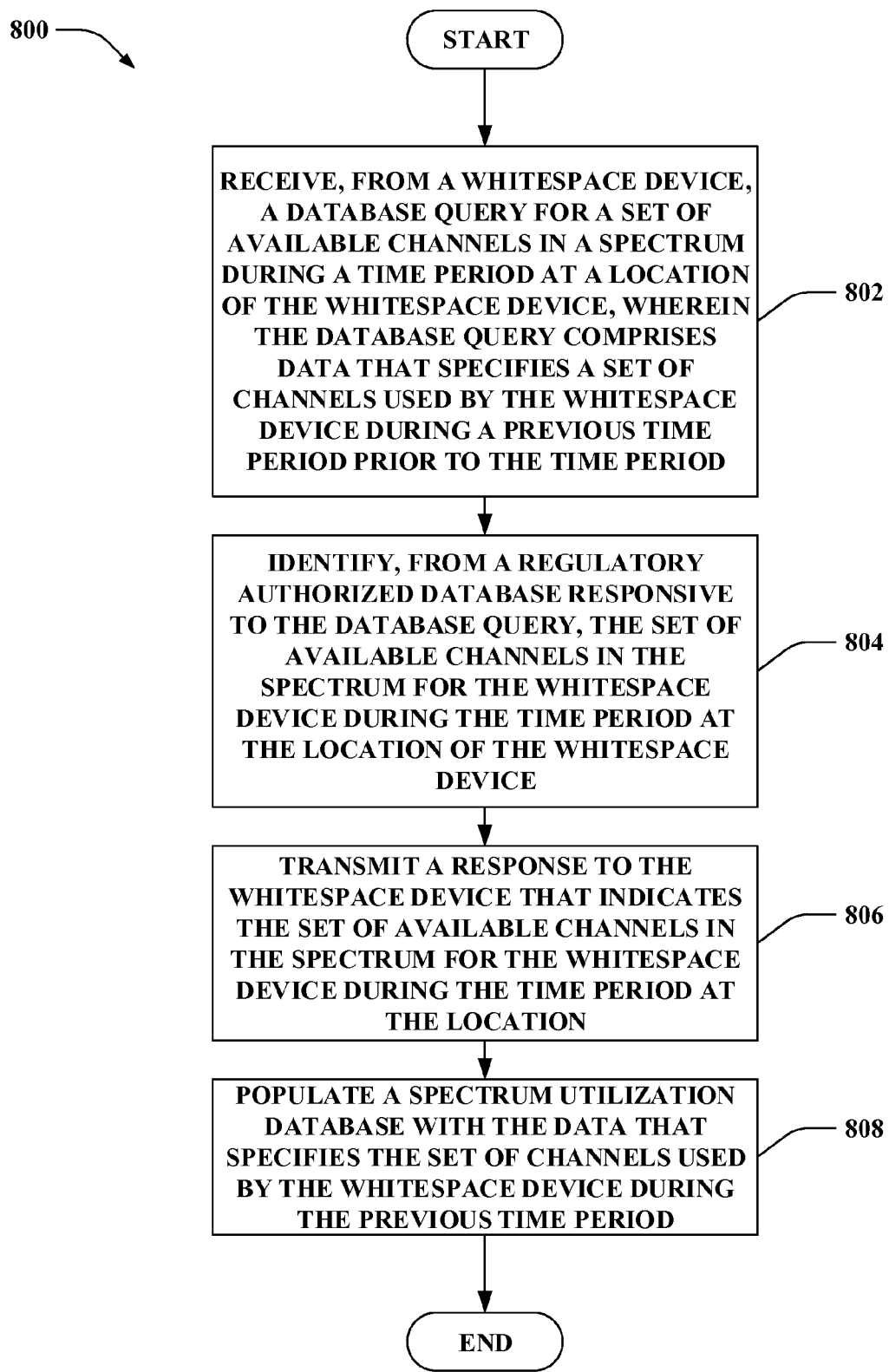
FIG. 8 is a flow diagram that illustrates an exemplary methodology of operating a regulatory authorized database system.

FIGS. 7-8 illustrate exemplary methodologies relating to reporting spectrum utilization feedback for whitespaces in a broadcast spectrum. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 of providing spectrum utilization feedback from a whitespace device. At 702, a database query can be transmitted. The database query can be for a set of available channels in a spectrum during a time period. Further, the database query can comprise data that specifies a set of channels used by the whitespace device during a previous time period prior to the time period. Moreover, the database query can be transmitted from the whitespace device to a regulatory authorized database system. For instance, the spectrum can be a broadcast spectrum, a licensed spectrum, an unlicensed spectrum (e.g., a U-NII band, etc.), a combination thereof, and so forth.

At 704, responsive to the database query, a response can be received at the whitespace device from the regulatory authorized database system. The response can indicate the set of available channels in the spectrum identified by the regulatory authorized database system for the whitespace device during the time period. Moreover, the whitespace device can be configured to opportunistically communicate in the spectrum over one or more of the available channels in the set. Further, the available channels in the set can be unassigned to licensees at the location of the whitespace device during the time period.

With reference to FIG. 8, illustrated is a methodology 800 of operating a regulatory authorized database system. At 802, a database query can be received from a whitespace device. The database query can be for a set of available channels in a spectrum during a time period at a location of the whitespace device. Further, the database query can include data that specifies a set of channels used by the whitespace device during a previous time period prior to the time period. For instance, the spectrum can be a broadcast spectrum, a licensed spectrum, an unlicensed spectrum (e.g., a U-NII band, etc.), a combination thereof, and so forth.

At 804, the set of available channels in the spectrum can be identified from a regulatory authorized database responsive to the database query. The set of available channels can be in the spectrum for the whitespace device during the time period at the location of the whitespace device. At 806, a response can be transmitted to the whitespace device that indicates the set of available channels in the spectrum for the whitespace device during the time period at the location. At 808, a spectrum utilization database can be populated with the data that specifies the set of channels used by the whitespace device during the previous time period. Such data can be identified from the database query received from the whitespace device.

Figure 9:
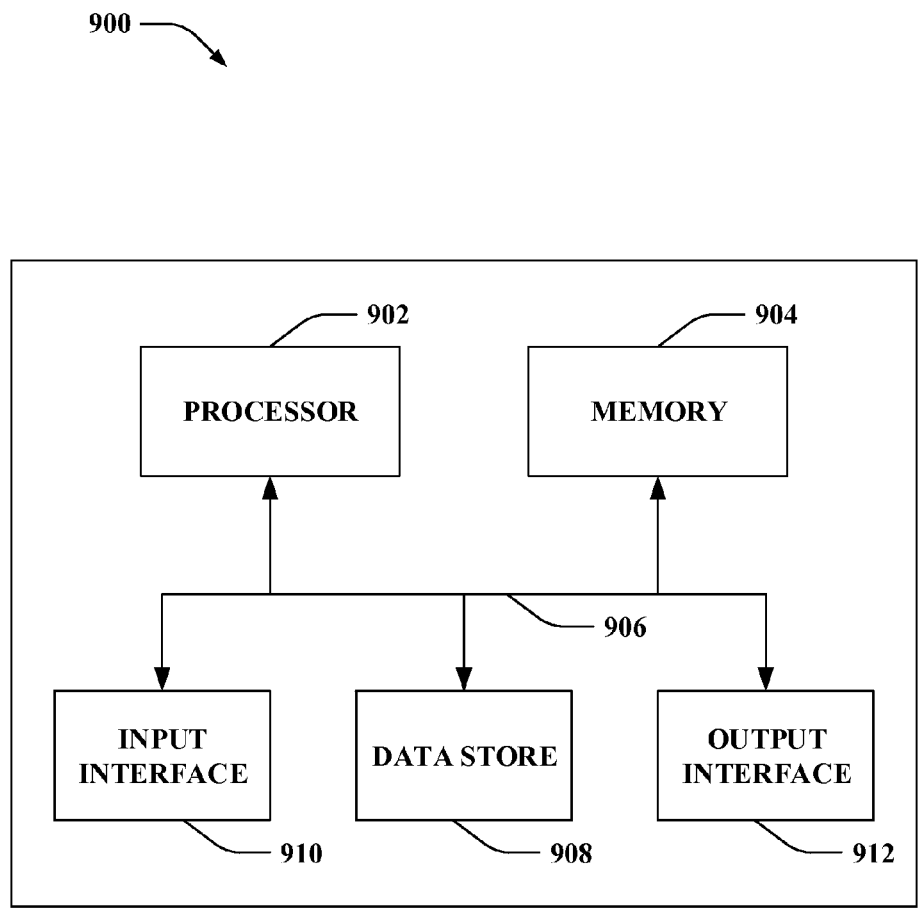
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be used in a system that reports, collects, uses, etc. spectrum utilization feedback for whitespaces in a broadcast spectrum. By way of example, the computing device 900 can be the whitespace device 102, the regulatory authorized database system 104, or the spectrum utilization database system 106; yet, the claimed subject matter is not so limited. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store the regulatory authorized database 212, the spectrum utilization database 220, the geolocation information 108, data pertaining to available channels, data pertaining to channels used during a previous time period, and so forth.

The computing device 900 additionally includes a data store 908 that is accessible by the processor 902 by way of the system bus 906. The data store 908 may include executable instructions, the regulatory authorized database 212, the spectrum utilization database 220, the geolocation information 108, data pertaining to available channels, data pertaining to channels used during a previous time period, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A whitespace device, comprising:
   at least one processor; and
   memory that comprises computer-executable instructions that, when executed by the at least one processor, cause the at least one processor to perform acts including:
      transmitting a database query for a set of available channels in a spectrum during a time period, the database query being transmitted for execution on a regulatory authorized database, wherein the spectrum is allocated by a telecommunications regulatory body;
      receiving, responsive to the database query, a response that indicates the set of available channels in the spectrum for the whitespace device during the time period, wherein the available channels in the set are unassigned to licensees at a location of the whitespace device during the time period;
      receiving channel usage data for the set of available channels in the spectrum, the channel usage data specifies actual usage of the spectrum by at least one disparate whitespace device prior to the time period respectively reported by the at least one disparate whitespace device when querying the regulatory authorized database; and
      controlling usage of one or more of the available channels in the spectrum by the whitespace device during the time period based on the channel usage data.

2. The whitespace device of claim 1, wherein the database query specifies a device class of the whitespace device, and wherein the response indicates the set of available channels in the spectrum for the device class during the time period.

3. The whitespace device of claim 2, wherein the device class is indicative of whether the whitespace device is a fixed device or a portable device.

4. The whitespace device of claim 1, the memory further comprising computer-executable instructions that, when executed by the at least one processor, cause the at least one processor to perform acts including:
   signing the database query using a private key, wherein a signed database query is authenticated using a public key.

5. The whitespace device of claim 1, the memory further comprising computer-executable instructions that, when executed by the at least one processor, cause the at least one processor to perform acts including:
  identifying the location of the whitespace device, wherein the database query further comprises geolocation information that specifies the location of the whitespace device.

6. The whitespace device of claim 1, the memory further comprising computer-executable instructions that, when executed by the at least one processor, cause the at least one processor to perform acts including:
  periodically transmitting the database query for the set of available channels in the spectrum.

7. The whitespace device of claim 1, wherein the database query comprises data that specifies a set of channels used by the whitespace device during a previous time period prior to the time period.

8. The whitespace device of claim 7, wherein the database query further comprises power level data for the whitespace device on the set of channels during the previous time period.

9. The whitespace device of claim 7, wherein the database query further comprises session length data indicative of a length of a session for the whitespace device on each of the channels during the previous time period.

10. The whitespace device of claim 1, wherein the spectrum is a broadcast spectrum.

11. The whitespace device of claim 1, wherein the set of available channels indicated in the response is a function of the actual usage of the spectrum reported by the at least one disparate whitespace device when querying the regulatory authorized database.

12. The whitespace device of claim 1, the memory further comprising computer-executable instructions that, when executed by the at least one processor, cause the at least one processor to perform acts including:
  transmitting a spectrum use query for the channel usage data for the set of available channels in the spectrum, the spectrum use query being transmitted for execution on a spectrum utilization database, and the channel usage data being received by the whitespace device responsive to the spectrum use query.

13. The whitespace device of claim 1, the memory further comprising computer-executable instructions that, when executed by the at least one processor, cause the at least one processor to perform acts including:
  transmitting, responsive to the response, information indicating at least one channel from the set of available channels expected to be used by the whitespace device during the time period.

14. The whitespace device of claim 1, the memory further comprising computer-executable instructions that, when executed by the at least one processor, cause the at least one processor to perform acts including:
  controlling a power level on each of the one or more of the available channels used by the whitespace device during the time period.

15. The whitespace device of claim 1 being a base station, the memory further comprising computer-executable instructions that, when executed by the at least one processor, cause the at least one processor to perform acts including:
  selecting a first channel from the set of the available channels for uplink communication; and
  selecting a second channel from the set of available channels for downlink communication.

16. A method of operating a whitespace device, comprising:
  transmitting, from the whitespace device, a database query for execution on a regulatory authorized database, the database query specifies a device class of the whitespace device and a location of the whitespace device, wherein the regulatory authorized database comprises information related to utilization of a broadcast spectrum by assigned licensees, and the broadcast spectrum is allocated by a telecommunications regulatory body;
  receiving, responsive to the database query, a response that indicates a set of available channels in the broadcast spectrum for the device class during the time period, wherein the available channels in the set are unassigned to licensees at the location of the whitespace device during the time period, wherein the available channels in the set are based on actual usage of the spectrum by at least one disparate whitespace device prior to the time period respectively reported by the at least one disparate whitespace device when querying the regulatory authorized database; and
  controlling usage of one or more of the available channels in the broadcast spectrum by the whitespace device during the time period.

17. The method of claim 16, wherein the database query comprises data that specifies a set of channels used by the whitespace device during a previous time period prior to the time period.

18. The method of claim 16, further comprising:
  transmitting, from the whitespace device, a spectrum use query for execution on a spectrum utilization database;
  receiving, responsive to the spectrum use query, channel usage data for the set of available channels in the broadcast spectrum, the channel usage data specifies the actual usage of the spectrum by the at least one disparate whitespace device prior to the time period respectively reported by the at least one disparate whitespace device when querying the regulatory authorized database; and
  selecting the one or more of the available channels for usage by the whitespace device during the time period based on the channel usage data.

19. A whitespace device, comprising:
  at least one processor; and
  memory that comprises computer-executable instructions that, when executed by the at least one processor, cause the at least one processor to perform acts including:
    transmitting a spectrum use query for execution on a spectrum utilization database;
    receiving, responsive to the spectrum use query, channel usage data for a set of available channels in a broadcast spectrum, the channel usage data specifies actual usage of the broadcast spectrum by at least one disparate whitespace device prior to a time period reported by the at least one disparate whitespace device when querying a regulatory authorized database, wherein the available channels in the set are unassigned to licensees at a location of the whitespace device during the time period, and the broadcast spectrum is allocated by a telecommunications regulatory body; and
    selecting one or more of the available channels for usage by the whitespace device during the time period based on the channel usage data.

20. The whitespace device of claim 19, the memory further comprising computer-executable instructions that, when executed by the at least one processor, cause the at least one processor to perform acts including:
  transmitting a database query for execution on the regulatory authorized database, the database query comprises data that specifies a set of channels used by the whitespace device during the previous time period; and receiving, responsive to the database query, a response that indicates the set of available channels in the broadcast spectrum for the whitespace device during the time period.

* * * * *